US010641415B2

(12) United States Patent
Vandlik et al.

(10) Patent No.: US 10,641,415 B2
(45) Date of Patent: May 5, 2020

(54) SUPPORT FOR CENTRIFUGE TUBING

(71) Applicant: MALLINCKRODT HOSPITAL PRODUCTS IP LIMITED, Dublin (IE)

(72) Inventors: Mark Vandlik, West Chester, PA (US); Shaun Wall, North Wales, PA (US); Josef Gabelberger, West Chester, PA (US); Eric Rabeno, Lincoln University, PA (US)

(73) Assignee: MALLINCKRODT HOSPITAL PRODUCTS IP LIMITED, Dublin (IE)

( * ) Notice: Subject to any disclaimer, the term of this patent is extended or adjusted under 35 U.S.C. 154(b) by 221 days.

(21) Appl. No.: 15/570,996

(22) PCT Filed: May 5, 2016

(86) PCT No.: PCT/US2016/031007
§ 371 (c)(1),
(2) Date: Oct. 31, 2017

(87) PCT Pub. No.: WO2016/179404
PCT Pub. Date: Nov. 10, 2016

(65) Prior Publication Data
US 2018/0299030 A1 Oct. 18, 2018

Related U.S. Application Data

(60) Provisional application No. 62/157,309, filed on May 5, 2015.

(51) Int. Cl.
*F16L 3/223* (2006.01)
*F16L 3/12* (2006.01)
(Continued)

(52) U.S. Cl.
CPC .............. *F16L 3/12* (2013.01); *B04B 5/0442* (2013.01); *F16C 35/067* (2013.01);
(Continued)

(58) Field of Classification Search
CPC . F16L 3/12; F16L 3/1075; F16L 3/223; B04B 5/0442; F16C 35/067
(Continued)

(56) References Cited

U.S. PATENT DOCUMENTS 2,271,336 A    1/1942  Goldsmith
3,804,324 A *  4/1974  Sinn ...................... B04B 5/0421
                                                            494/14

(Continued)

FOREIGN PATENT DOCUMENTS

EP    2397228 A2   12/2011
GB    2040348 A     8/1980
WO    9846363 A1   10/1998

OTHER PUBLICATIONS

International Preliminary Report on Patentability of the International Searching Authority (Forms PCT/IPEA/416, PCT/IPEA/409 and PCT/Separate Sheet/409), dated Apr. 19, 2017, for International Application No. PCT/US2016/031007.

*Primary Examiner* — Terrell L McKinnon
*Assistant Examiner* — Michael McDuffie
(74) *Attorney, Agent, or Firm* — Snell & Wilmer L.L.P.

(57) ABSTRACT

The current disclosure presents embodiments directed to, among others, a support and/or clamp (60) for receiving a cylindrical element (e.g., a bearing (90)), which can include a base (62), a pair of opposed receiving members (64) projecting from the base (62) and spaced apart from one other to establish a receiving area (66) configured with a size and shape to removably receive at least one of a circular, cylindrical and spherical object therein, and at least one of
(Continued)

a detent (24) and magnet (40) arranged within at least a portion of the receiving area (66), the detent (24) and/or magnet (40) configured to at least one of temporarily retain the object within the receiving area (66) and establish a sound associated with the receiving of the object.

28 Claims, 23 Drawing Sheets

(51) Int. Cl.
  *B04B 5/04* (2006.01)
  *F16C 35/067* (2006.01)
  *F16L 3/10* (2006.01)
  *F16L 3/16* (2006.01)

(52) U.S. Cl.
  CPC ..... *F16L 3/1075* (2013.01); *B04B 2005/0492* (2013.01); *F16C 2226/18* (2013.01); *F16C 2226/50* (2013.01); *F16C 2316/10* (2013.01); *F16L 3/16* (2013.01)

(58) Field of Classification Search
  USPC .... 248/683, 686, 689, 671, 49, 65, 67.5, 73, 248/74.1
  See application file for complete search history.

(56) References Cited

U.S. PATENT DOCUMENTS

| | | | |
|---|---|---|---|
| 3,845,927 A * | 11/1974 | Bratschi | A47H 1/14 248/223.41 |
| 4,079,882 A * | 3/1978 | Mizuyoshi | B04B 5/0421 248/638 |
| 4,193,536 A * | 3/1980 | Kubota | B04B 5/0421 494/14 |
| 4,822,331 A * | 4/1989 | Taylor | B04B 5/0414 494/16 |
| 5,336,179 A | 8/1994 | Ryan | |
| 5,566,919 A * | 10/1996 | Shephard | B04B 9/12 248/154 |
| 5,622,341 A | 4/1997 | Stana | |
| 5,676,339 A * | 10/1997 | Simon | H02G 3/065 174/153 G |
| 6,344,020 B1 * | 2/2002 | Reitz | B04B 5/0442 384/523 |
| 6,502,794 B1 * | 1/2003 | Ting | E03C 1/06 248/205.5 |
| 6,561,206 B1 * | 5/2003 | Wilkinson | A61H 3/0244 135/65 |
| 6,957,926 B2 | 10/2005 | Okuda | |
| 7,699,277 B2 * | 4/2010 | Bagnall | A01K 63/006 119/230 |
| 7,798,333 B2 * | 9/2010 | Zuk, Jr. | B01D 29/085 210/406 |
| 8,403,278 B1 * | 3/2013 | Kasbohm | F41C 33/06 211/64 |
| 8,950,727 B2 * | 2/2015 | Skudelny | B63C 11/205 128/201.27 |
| 2002/0179780 A1 * | 12/2002 | Benoit | F16B 21/084 248/73 |
| 2010/0116947 A1 * | 5/2010 | Winkler | F16L 3/06 248/73 |
| 2011/0297797 A1 * | 12/2011 | Yelverton | B60T 11/046 248/70 |
| 2012/0005868 A1 | 1/2012 | Suderman | |
| 2012/0271237 A1 | 10/2012 | Andino | |
| 2012/0329630 A1 * | 12/2012 | Hoffmann | B04B 3/00 494/36 |
| 2015/0090845 A1 * | 4/2015 | Trelford | F16M 13/022 248/68.1 |

* cited by examiner

SUPPORT FOR CENTRIFUGE TUBING

CROSS-REFERENCE TO RELATED APPLICATIONS

This patent application is a is a U.S. National Stage of PCT/US2016/031007, filed on May 5, 2016, which claims the benefit of U.S. Provisional Patent Application Ser. No. 62/157,309, that was filed on May 5, 2015 (now expired). Priority is claimed to each patent application set forth in this Cross-Reference to Related Applications section, and the entire disclosure of each such patent application is hereby incorporated by reference.

TECHNICAL FIELD

Embodiments of the present disclosure generally relate to apparatuses, systems and methods for supporting a tube or conduit for directing fluids into a centrifuge system.

BACKGROUND

Centrifuges are used to separate a fluid into a plurality of fluid constituents by inducing a density gradient within the fluid. One known centrifuge configuration uses a disposable that includes a centrifuge bowl and a drive tube that extends from the top of the centrifuge bowl, where a plurality of separate conduits are disposed within this drive tube. Fluid may be directed into the centrifuge bowl through one of these conduits, and various fluid constituents may be removed from the centrifuge bowl through one or more of these conduits. In any case, this centrifuge bowl may be secured relative to a rotating frame, and the drive tube may be clamped or otherwise secured to the rotating frame during centrifuging.

SUMMARY

According to some embodiments of the present disclosure, a support (and/or clamp) for receiving a cylindrical element is provided, which may comprise a base, a pair of opposed receiving members projecting from the base and spaced apart from one another to establish a receiving area configured with a size and shape to receive at least one of a circular, cylindrical and spherical object therein, and at least one of a detent and magnet arranged within at least a portion of the receiving area, the detent and/or magnet configured to at least one of retain the object within the receiving area and establish a sound associated with the receiving of the object.

Some embodiments may include one and/or another of the following features/functionality:
  the receiving area of such a support may be configured to removably receive the object;
  upon the at least one of the detent and magnet being configured to retain the object within the receiving area, such configuration corresponds to temporary retention of the object within the receiving area;
  a lockout means, where, in some embodiments, the lockout means comprises a locking arm configured to substantially bridge the distance between the two receiving members upon the object being received, such that the object is locked within the receiving area;
  the locking arm, noted above, may removably lock the object within the the receiving area;
  the locking arm, noted above, may include a first end which pivots relative to one of the receiving members and a second end which removably locks in or on the other of the receiving members;
  a circumferential support member configured to surround at least a portion of at least one of the base and one and/or another of the receiving members;
  at least one of a chamfer and ramp provided on at least one of the base, and one and/or another of the receiving members, the chamfer and ramp being configured to aid in the loading of the object in the receiving area;
  the object may be a bearing;
  the base may include or comprise a post configured for being received in an opening;
  a recess arranged within the base to receive a guide pin; and
  a guide pin projecting from the base for receipt within a recess of a structure.

In some embodiments, a centrifuge system is provided which may comprise a centrifuge bowl configured to spin along a central axis, a tube projecting from the center of the centrifuge bowl initially along the central axis, at least one bearing arranged along the tube, where the tube is configured to be arranged within the center of the bearing, a support arm or structure surrounding at least a portion of the container, and at least one support according to one and/or another of embodiments and arranged on at least the support arm. Each of the at least one supports is configured to receive at least one of the tube and bearing such that, upon rotation of bowl, the tube rotates within the bearing, the outer portion of the bearing being affixed to the support.

In some embodiments, a method for connecting a tube within a centrifuge system is provided and comprises providing a centrifuge system having a centrifuge bowl, providing a tube having arranged thereon at least one bearing arranged thereon, providing a support in accordance with the foregoing, aligning each bearing to the side of the ramp and/or chamfer of the support, and pushing and/or pulling each bearing into the receiving area, such that, a side of the bearing rides along the ramp and/or chamfer until the edge of the bearing is received within the receiving area.

BRIEF DESCRIPTION OF THE DRAWINGS

The principals and operations of the devices, methods and systems, according to some embodiments of the present disclosure, may be better understood with reference to the drawings, and the following description. These drawings are given for illustrative purposes only and are not meant to be limiting. The figures illustrate various embodiments.

DETAILED DESCRIPTION

Figure 1A:
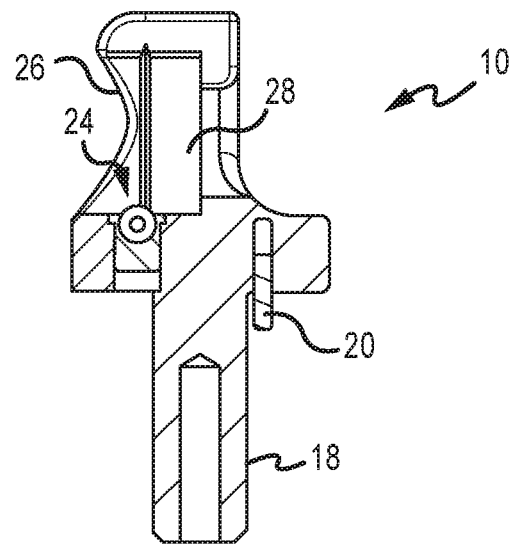
FIGS. 1A-D are illustrations of a bearing support and/or clamp in cross-section, exploded front, exploded iso, and exploded side views, respectively, according to some embodiments.
Figure 1B:
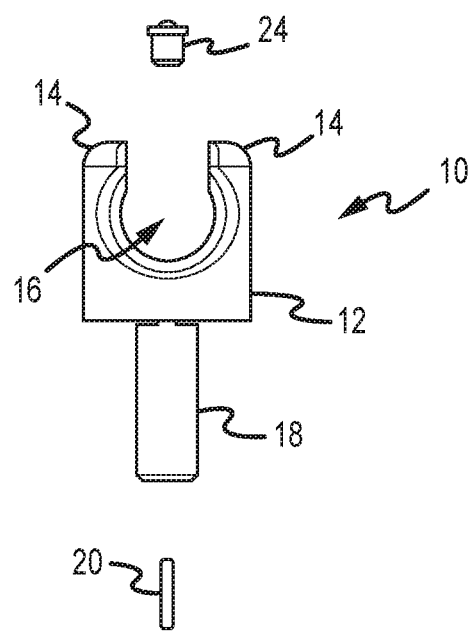
Figure 1C:
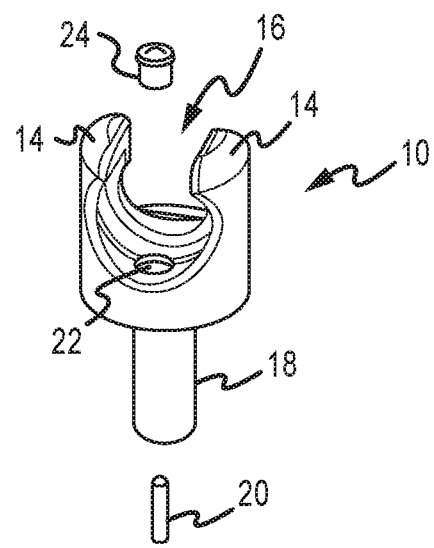
Figure 1D:
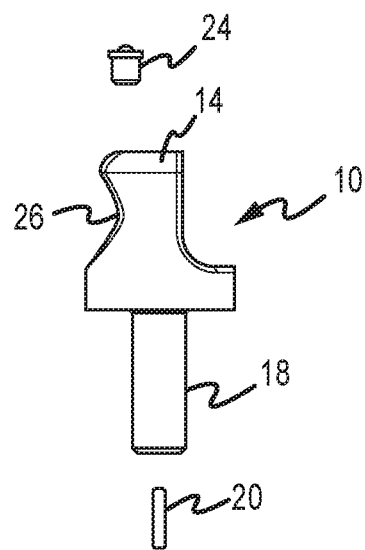

FIGS. 1A-D illustrate various views of a bearing support 10 according to some embodiments of the present disclosure. As shown, the bearing support 10 generally includes a base 12, along with a pair of opposed and spaced projections 14 which establish a receiving area 16 therebetween. The bearing support 10 has a post or mounting post 18 which is received in a structural member (or other housing element) of a centrifuge (for example), and can include fixation means comprising a detent 24, screw or frictional fit (for example).

The base 12 of the bearing support 10 can also include a dowel pin 20 which is affixed in a recess (alternatively, a projection can be machined/formed into the base 12), which is then received by the structural member to which the bearing support 10 is mounted (this can be used to allow the bearing support 10 to pivot a certain amount around a linear axis of the mounting post 18).

A load bearing area 28 may be recessed such that an edge of a bearing is received therein. Other features which enable the efficient and speedy mounting of a bearing and/or tube-bearing combinations include one or more chamfers 26 and one or more "ramps", which may facilitate directing the bearing and/or tube into the receiving area 16 of the bearing support 10. The noted detent 24 (e.g., ball detent) may be used to aid in locking/retaining the bearing in place within the bearing support 10, and may be disposed within a detent aperture 22 of the bearing support 10.

FIGS. 2A-C, 3A-C, and 4A-C, illustrate some embodiments of the present disclosure. In these embodiments, like those in FIGS. 1A-D, there is a post, two projections which create a receiving area, and a dowel pin/functionality. In addition, the embodiments include an arm which bridges the opening between the two projections and the receiving area (in some embodiments, it substantially bridges the opening). The arm may pivot on one projection, by means of a pin which is received in an opening on the projection, and may also be spring loaded via a spring (affixed via a bolt/rivet). Further features include a magnet which can be used to both help guide a bearing into the receiving area (and/or bearing recess therein), but may also provide an audible "click" which assures that the bearing is properly in place (the ball detent 24 noted above can perform a similar function).

Figure 2A:
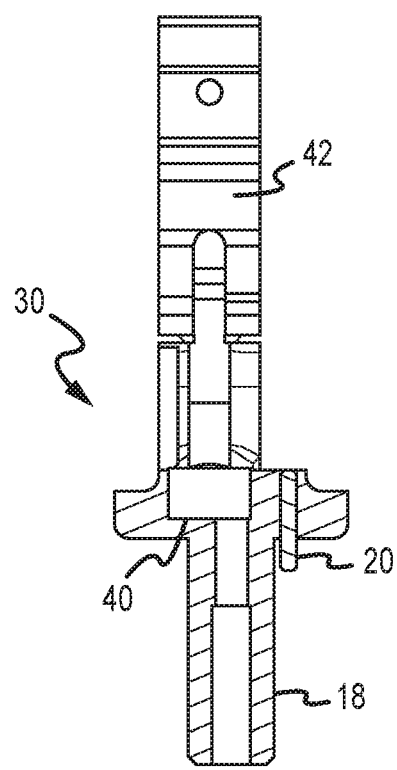
FIGS. 2A-C are illustrations of a bearing support and/or clamp in cross-section, exploded front, and exploded iso views, respectively, according to some embodiments.
Figure 2B:
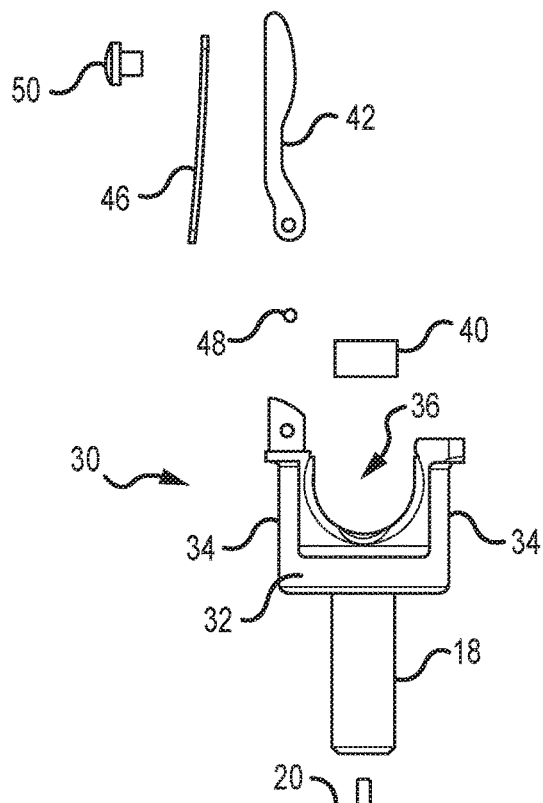
Figure 2C:
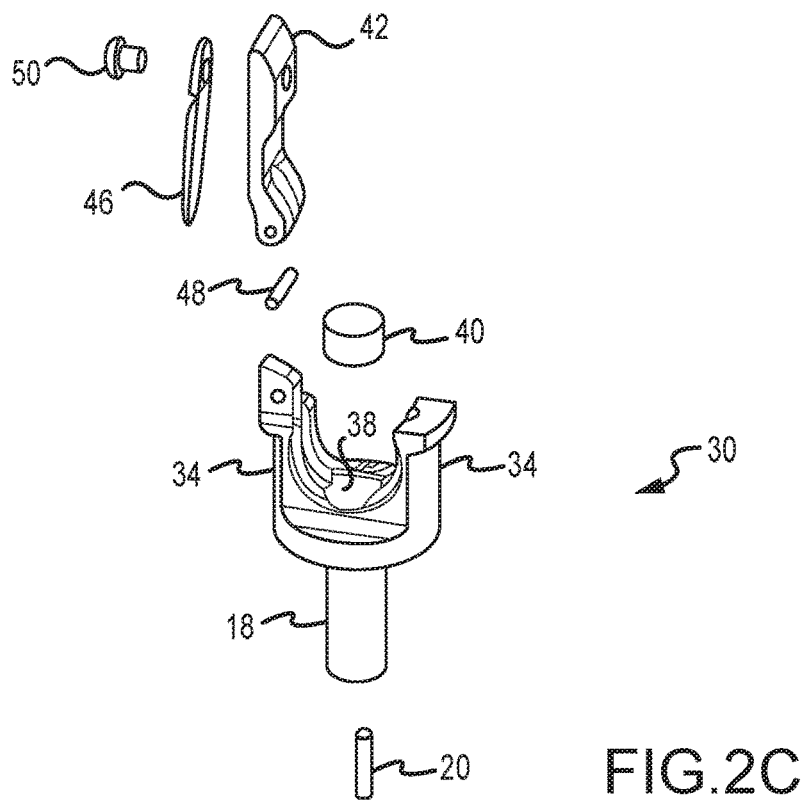

In the embodiments of FIGS. 2A-C, the bearing support 30 generally includes a base 32, a pair of opposed and spaced projections 34 which establish a receiving area 36 therebetween, along with the above-noted arrangement of a post 18 and pin 20. The bearing support 30 further includes a retaining arm 42 which bridges the opening or space between the upper portion of the two projections 34 and the receiving area 36. The retaining arm 42 may pivot on one projection 34, by means of a pin 48 which is received in an opening on the upper end of one of the projections 34, and may also be spring loaded via a spring 46 (affixed via an appropriate fastener 50). The bearing support 30 further includes a magnet aperture 38 in which a magnet 40 is positioned.

Figure 3A:
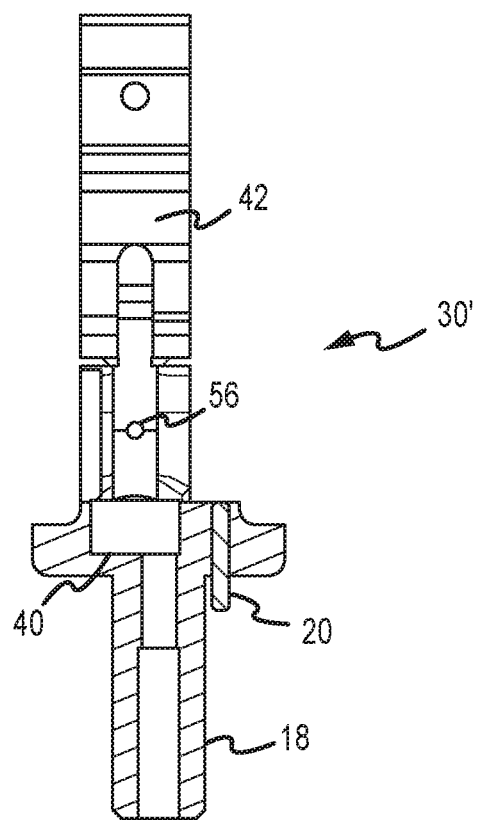
FIGS. 3A-C are illustrations of a bearing support and/or clamp in cross-section, exploded front, and exploded iso views, respectively, according to some embodiments.
Figure 3B:
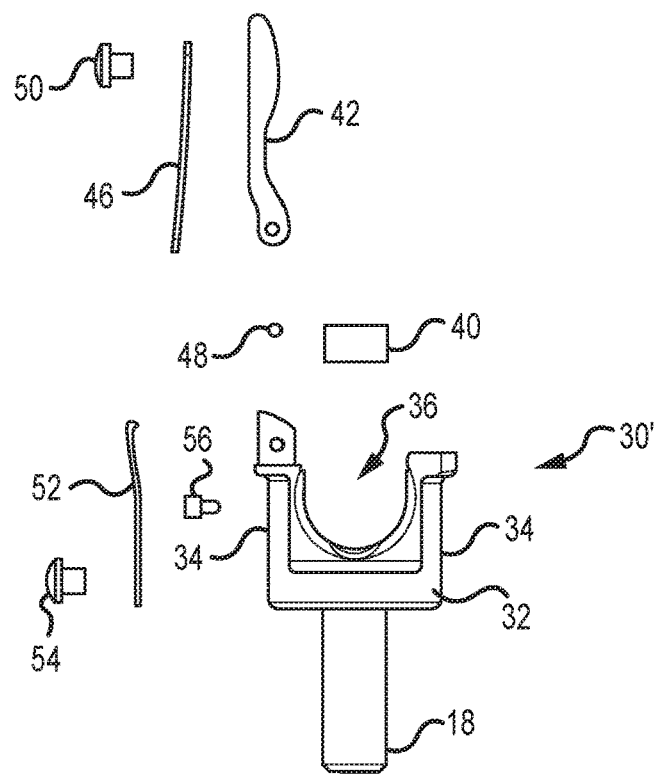
Figure 3C:
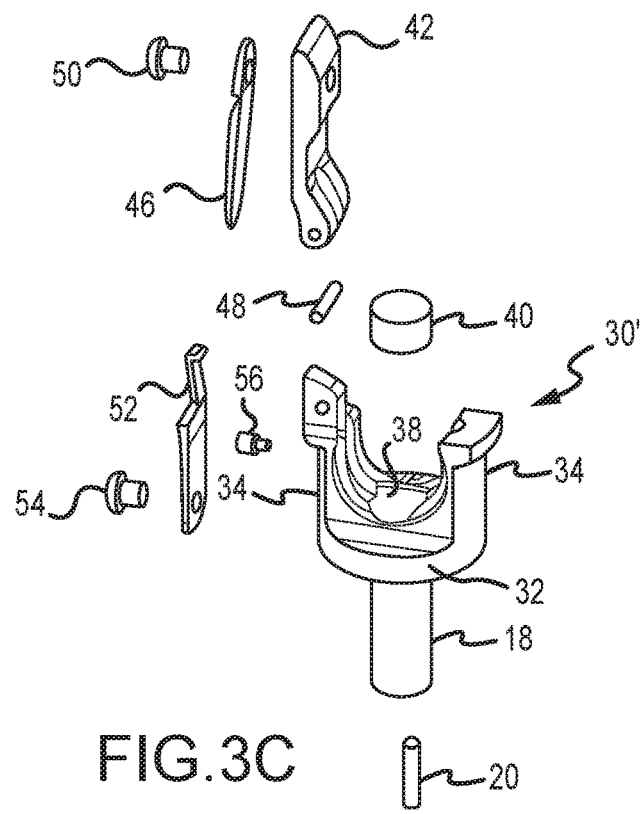
Figure 4A:
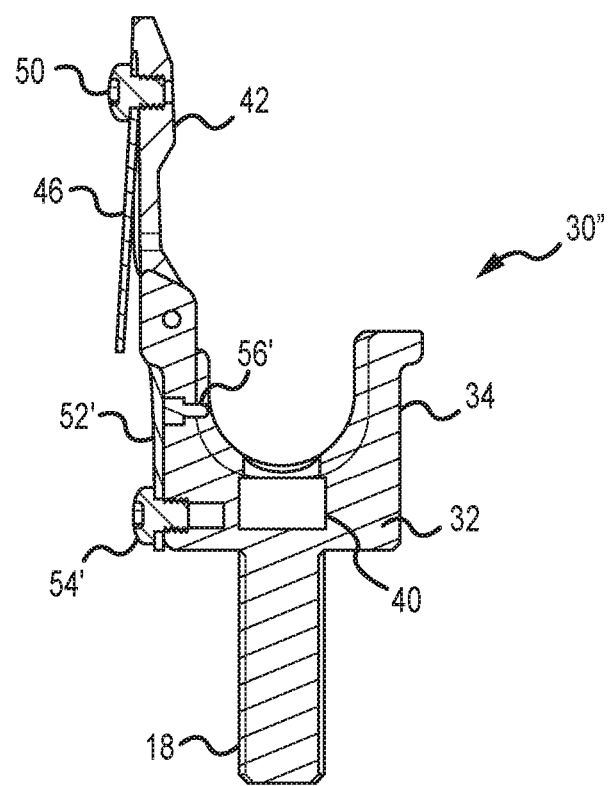
FIGS. 4A-C are illustrations of a bearing support and/or clamp in cross-section, exploded iso, and exploded front views, respectively, according to some embodiments.
Figure 4B:
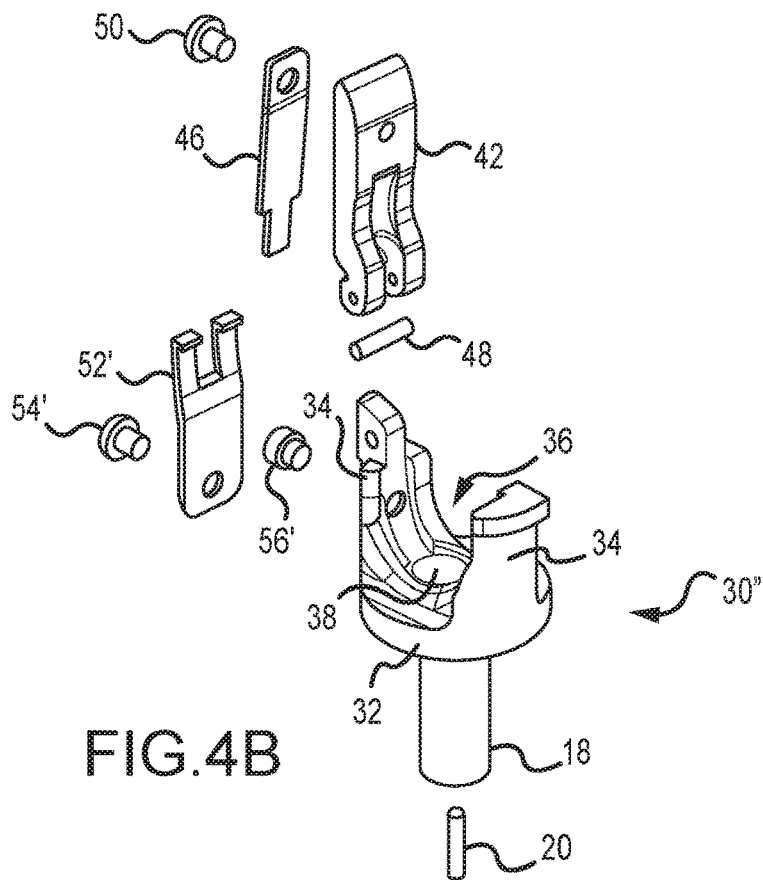
Figure 4C:
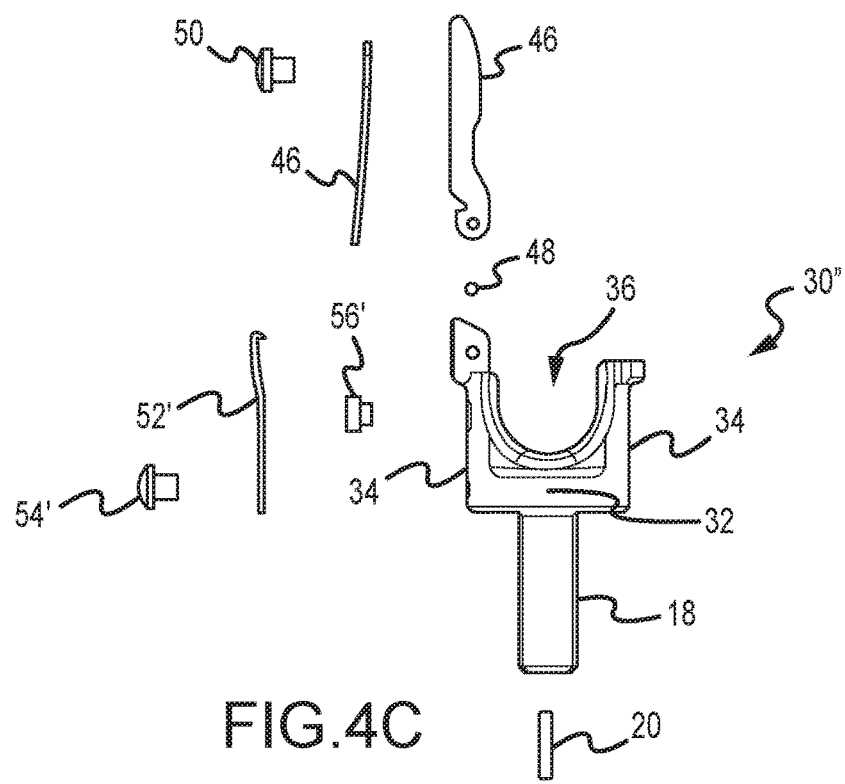

Such embodiments as disclosed in FIGS. 3A-C, and 4A-C, may also include a spring/arm lock, which insures that the arm bridging the receiving area is at least substantially locked into place. So as to be able to move the arm to, say, remove the bearing from the support, a release pin may also be included, which, when pressed (or pulled, depending upon how the pin is set up), releases the spring lock and allows the arm to open. Various aspects of such embodiments are illustrated in FIGS. 4A-C.

The bearing support 30' in accordance with the embodiments of FIGS. 3A-C includes corresponding features to those discussed above in relation to FIGS. 2A-C, along with a spring lock 52 that may be secured to one of the projections 34 by an appropriate fastener 54, and which insures that the retaining arm 42 bridging the receiving area 36 is at least substantially locked into place. So as to be able to move the retaining arm 42 to, say, remove a bearing from the bearing support 30', a release pin 56 may also be included, which, when pressed (or pulled, depending upon how the pin 56 is set up), releases the spring lock 52 and allows the retaining arm 42 to open.

The bearing support 30" in accordance with the embodiments of FIGS. 4A-C includes corresponding features to those discussed above in relation to FIGS. 2A-C, along with a different mechanism (from that disclosed in FIGS. 3A-C) to retain the retaining arm 42 in a closed position, and that is in the form of a locking arm 52', associated fastener 54', and locking pin release 56'.

Figure 5A:
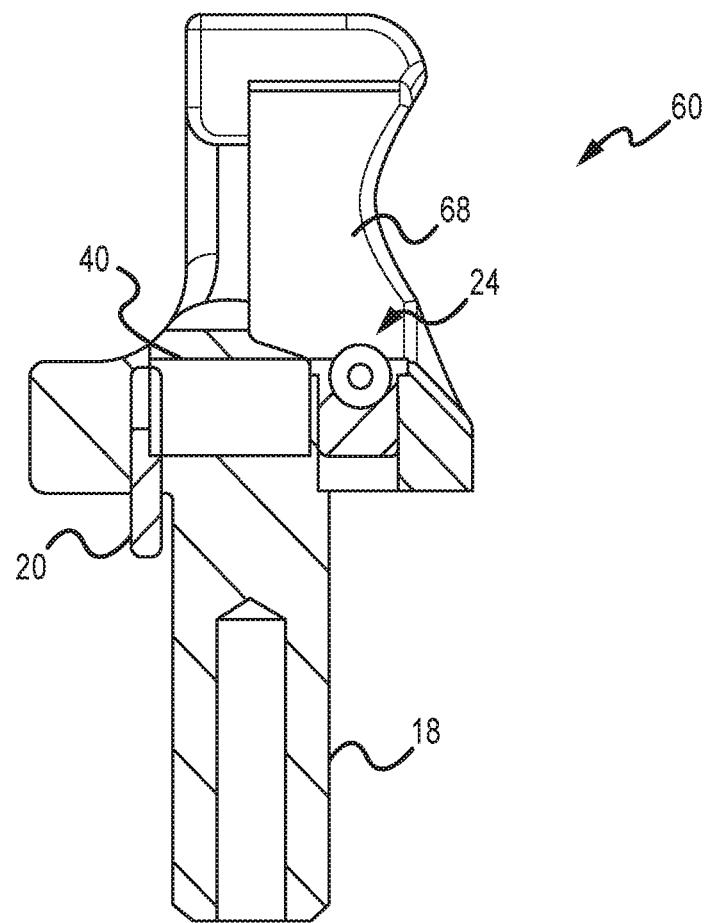
FIGS. 5A-C are illustrations of a bearing support and/or clamp in cross-section, exploded front, and exploded iso views, respectively, according to some embodiments.
Figure 5B:
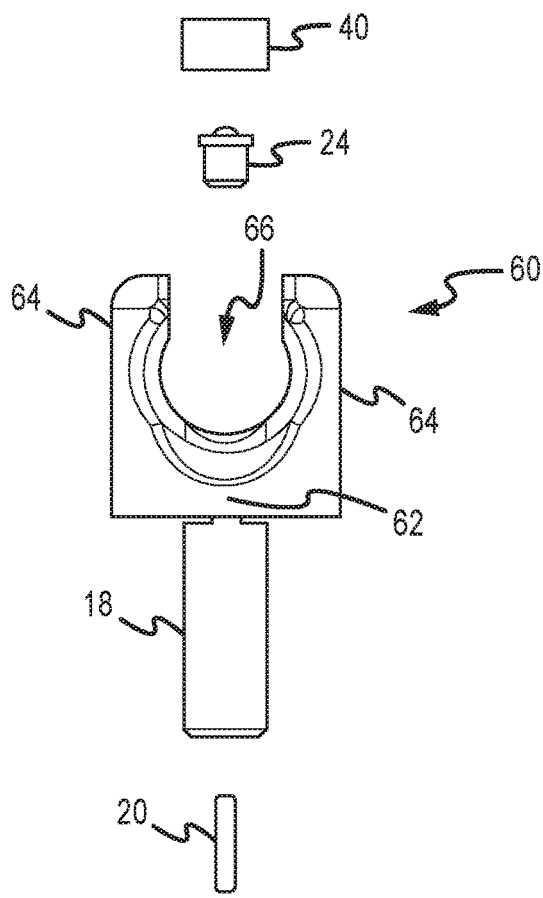
Figure 5C:
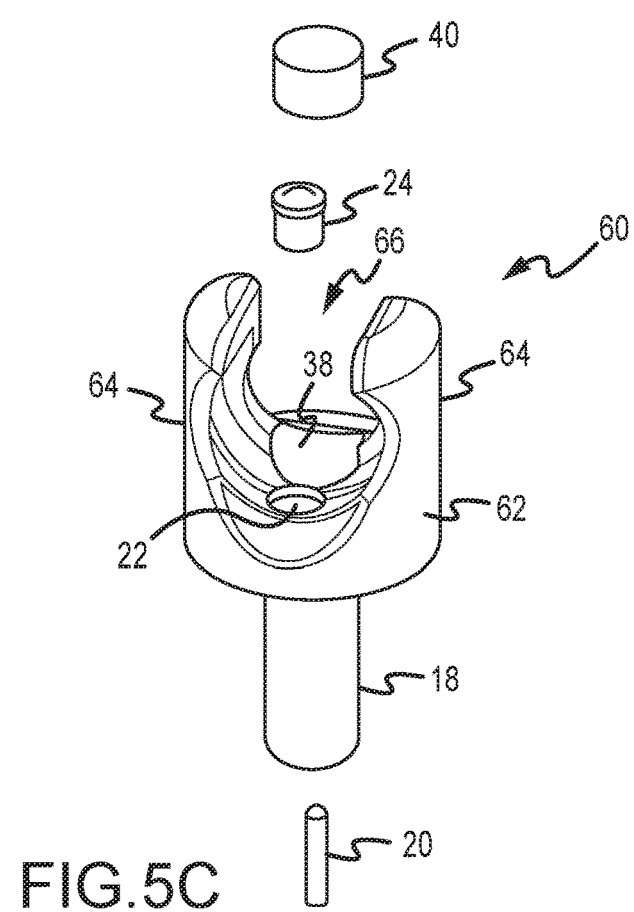

FIGS. 5A-C illustrate yet other embodiments of the present disclosure. In such embodiments, similar to those described and illustrated earlier, the bearing support 60 includes a base 62, two projections 64 housing a receiving area 66, and a load bearing area 68, where these projections 64 again are disposed in opposing relation and are spaced from one another. The bearing support 60 also utilizes the above-noted arrangement of a post 18 and pin 20. However, in these embodiments, both a ball detent 24 (associated detent aperture 22) and a magnet 40 (associated magnet aperture 38) may be included, which either or both can serve to both guide and/or substantially affix the bearing in place within the bearing support 60, and/or may also be used for audible confirmation that the bearing is received.

Figure 6A:
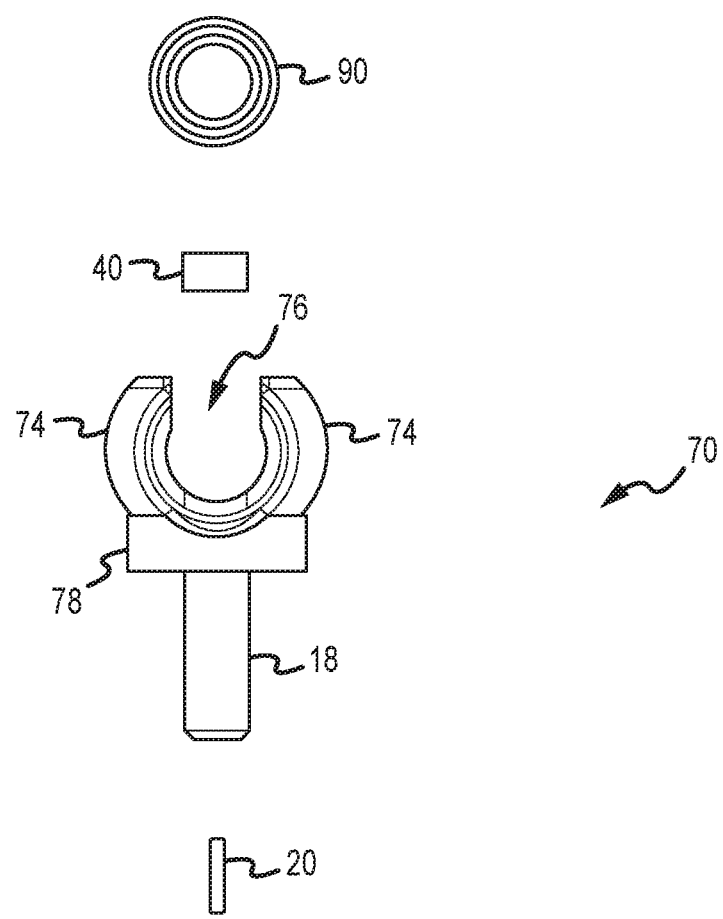
FIGS. 6A-C are illustrations of a bearing support and/or clamp in front, exploded iso, and exploded side views, respectively, according to some embodiments.
Figure 6B:
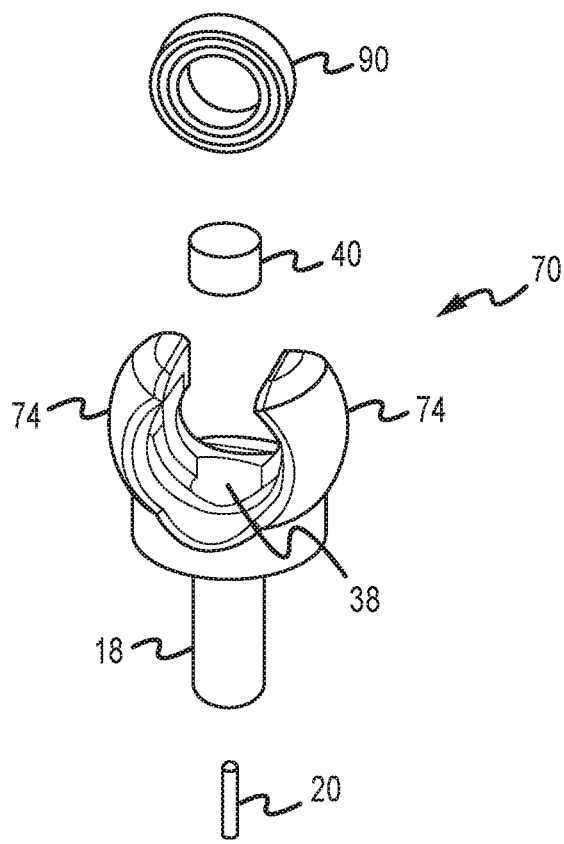
Figure 6C:
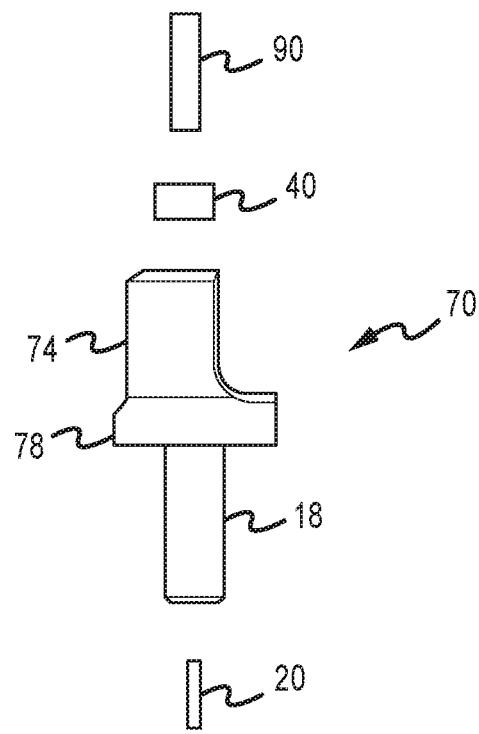
Figure 7A:
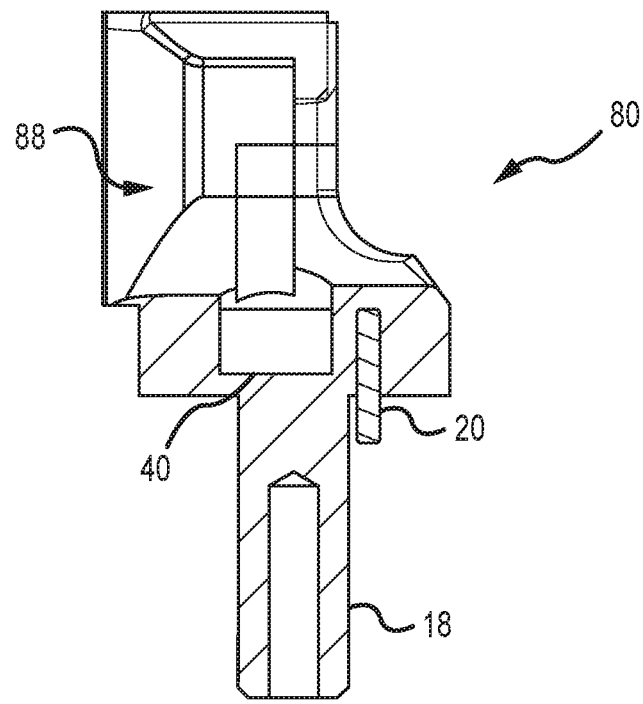
FIGS. 7A-D are illustrations of a bearing support and/or clamp in cross-section, exploded iso, and exploded front and exploded side views, respectively, according to some embodiments.
Figure 7B:
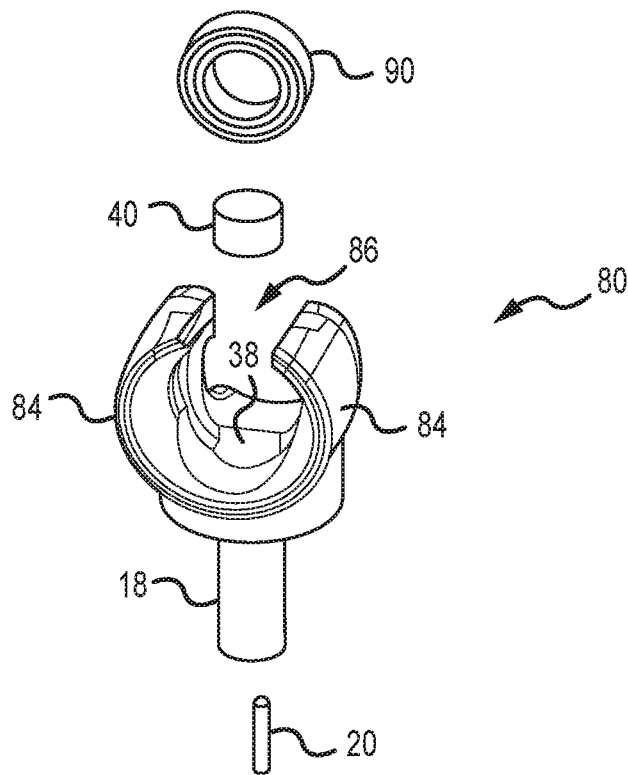
Figure 7C:
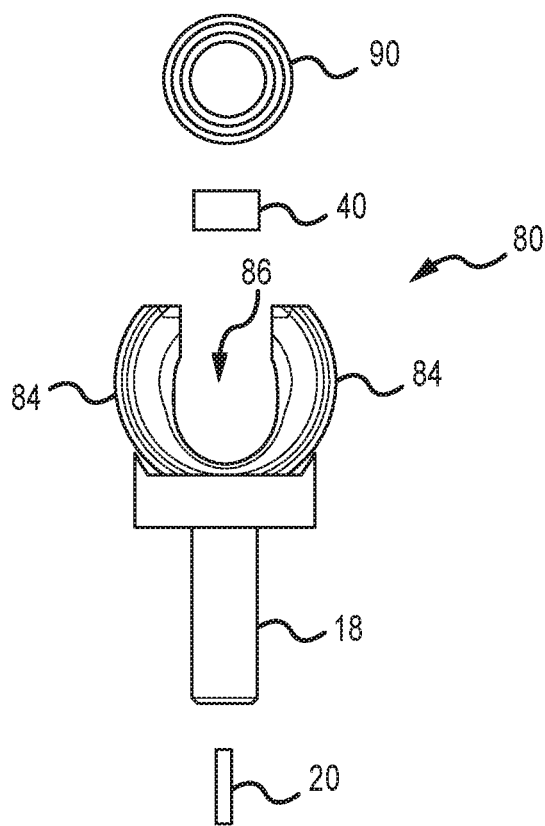
Figure 7D:
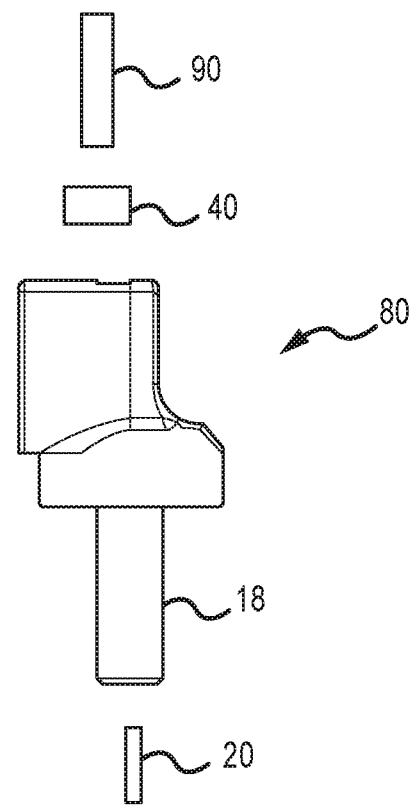
Figure 8A:
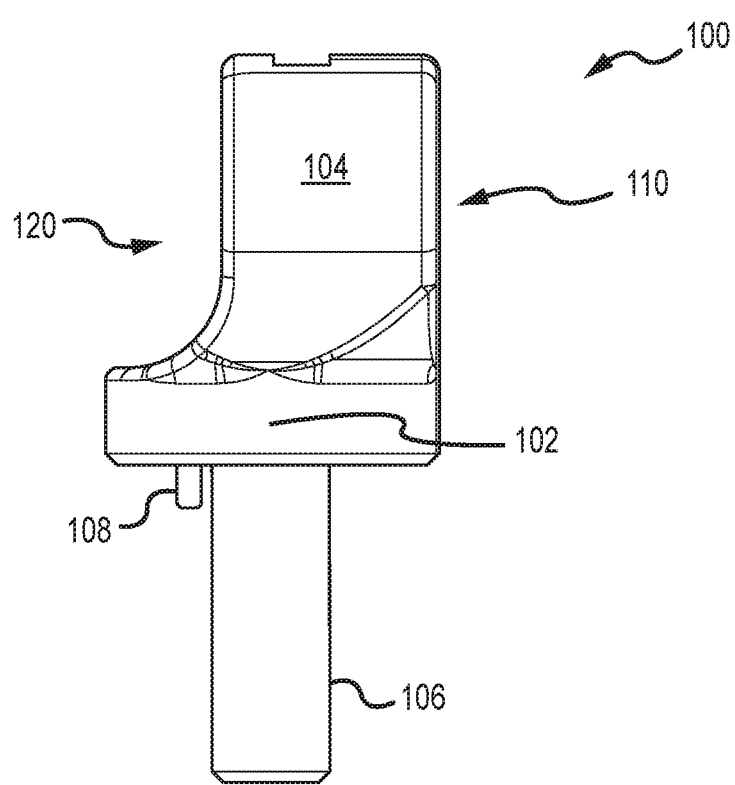
FIG. 8A is a side view of another embodiment of a bearing support.
Figure 8B:
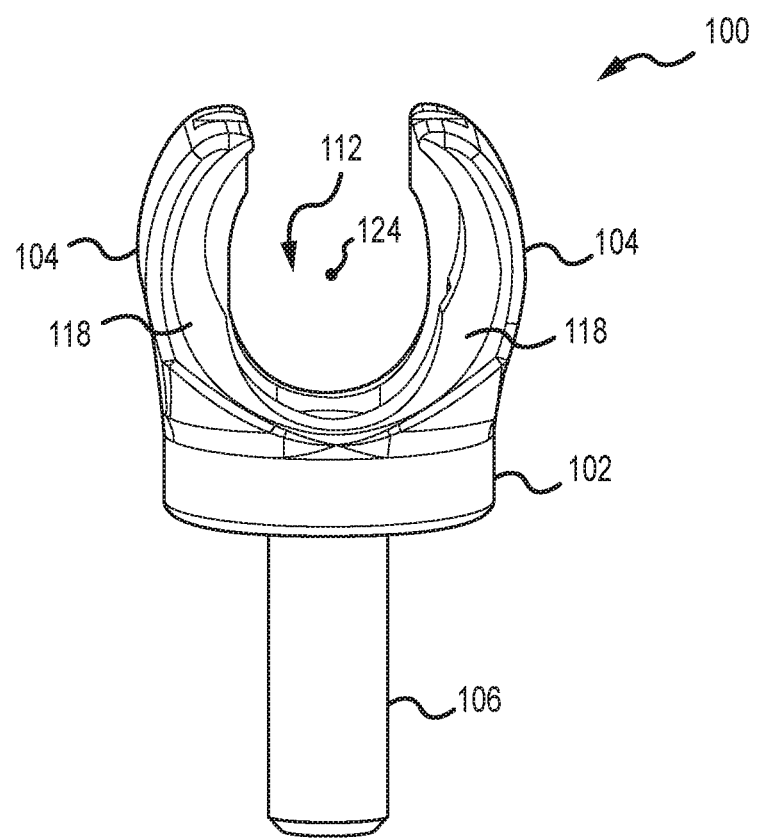
FIG. 8B is an end view of a loading end of the bearing support of FIG. 8A.
Figure 8C:
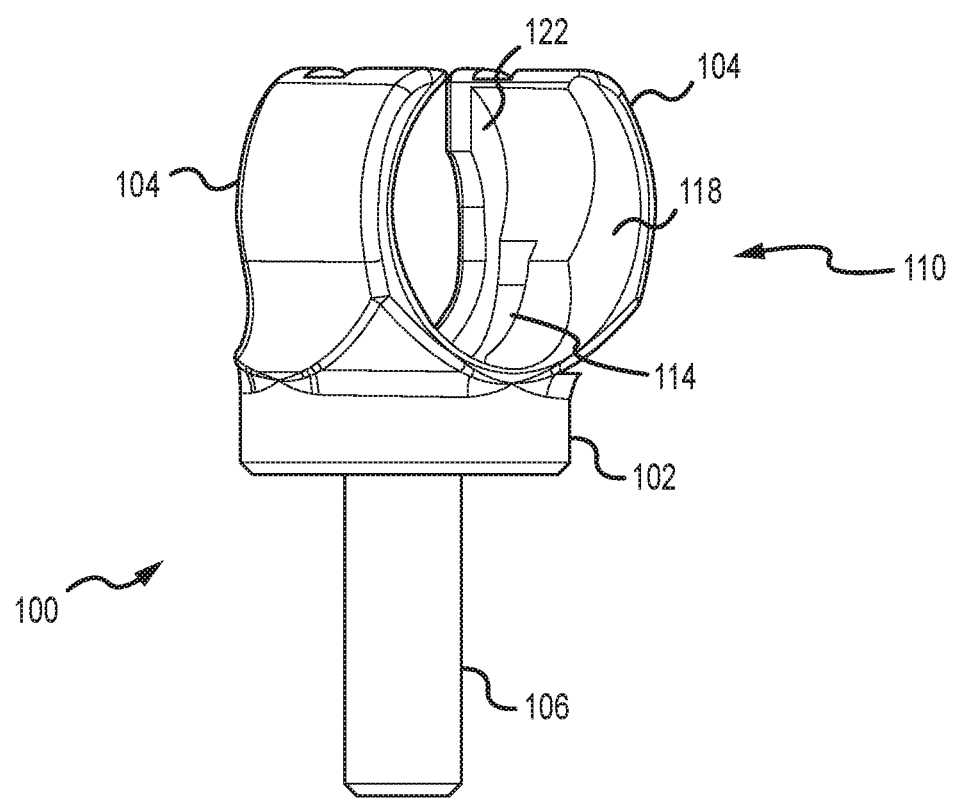
FIGS. 8C-8E are perspective views of the loading end of the bearing support of FIG. 8A, illustrating a bearing slot and/or magnet aperture that are located within a receiving area of the bearing support.
Figure 8D:
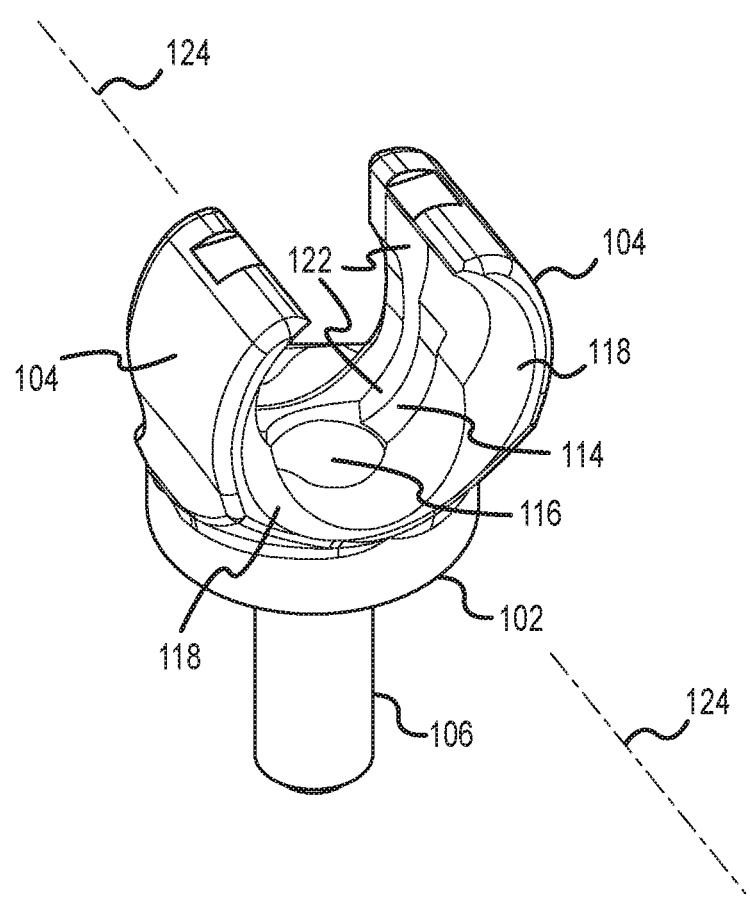
Figure 8E:
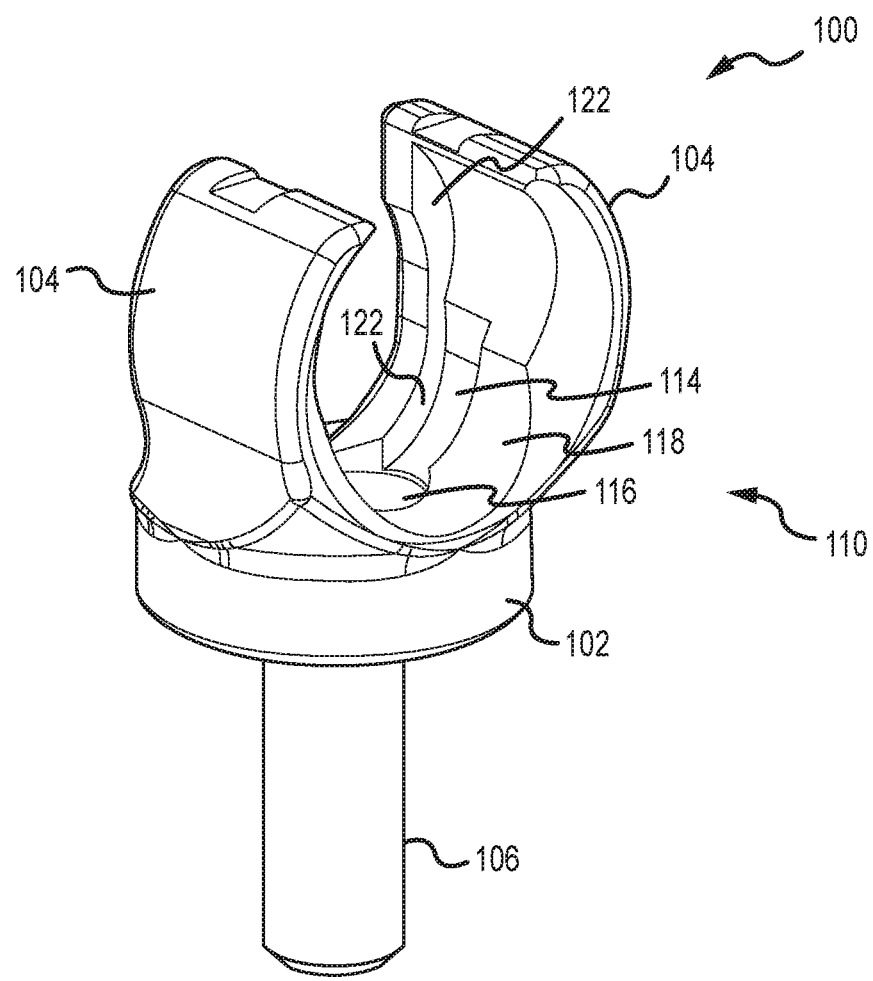
Figure 8F:
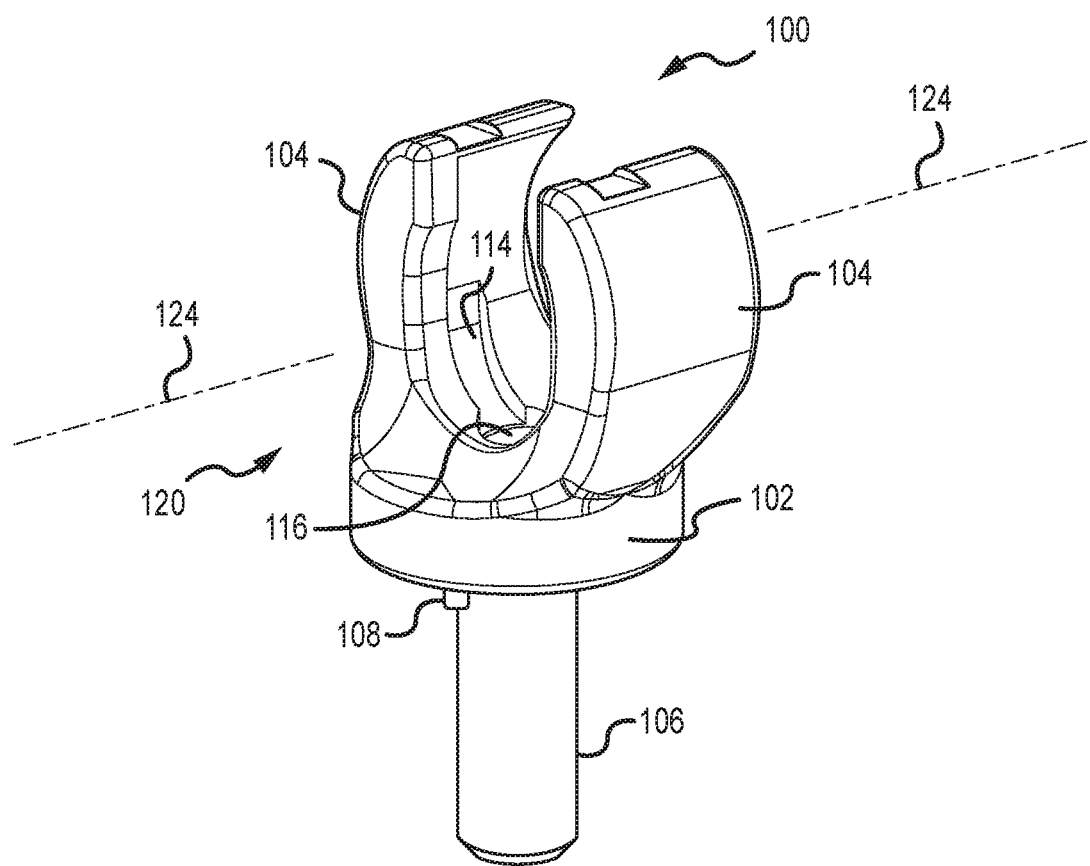
FIG. 8F is a perspective view of a non-loading end of the bearing support of FIG. 8A.

The embodiments shown in FIGS. 6A-C are yet further embodiments of the support and include similar features and functionality as those described in earlier embodiments. In such embodiments, similar to those described and illustrated earlier, the bearing support 70 includes a base 72 and two projections 74 housing a receiving area 76, where these projections 74 again are disposed in opposing relation and are spaced from one another. The bearing support 70 also utilizes the above-noted arrangement of a post 18 and pin 20, along with magnet 40 and an associated magnet aperture 38. Additionally, these embodiments help illustrate a circumferential base support 78 which is configured to surround at least a portion of at least one of the projections 74. Additionally, in these embodiments, a bearing 90 is illustrated (which may be the same type, shape, and form of a bearing as may be used in earlier embodiments).

FIGS. 7A-D show yet further embodiments according to the present disclosure. These embodiments are similar to those of FIGS. 5A-C and 6A-C. In this regard, the bearing support 80 includes a base 82 and two projections 84 housing a receiving area 86, where these projections 84 again are disposed in opposing relation and are spaced from one another. The bearing support 80 also utilizes the above-noted arrangement of a post 18 and pin 20, along with magnet 40 and an associated magnet aperture 38. The bearing support 80 also incorporates a ramp 88 (and/or a chamfer) which may be used to help guide the bearing 90 into the receiving area 86/bearing recess/ring.

FIGS. 8A-8E illustrate yet another embodiment of a bearing support and that is identified by reference numeral 100. The bearing support 100 includes a base 102 and a pair of projections 104 that extend upwardly from the base 102 and that are spaced from one another in opposing relation to define a receiving area 112 for the bearing 90. The bearing support 100 also includes the above-noted arrangement of a post 106 and pin 108.

The bearing support 100 is configured to require the bearing 90 to be positioned in the receiving area 112 only through an open loading end 110 of the bearing support 100. The bearing 90 cannot be directed into the receiving area 112 through the space between the upper portions of the projections 104 (e.g., the spacing between the upper portions of the projections 104 is smaller than the outer diameter of the bearing 90 for which the bearing support 100 is configured). The bearing 90 also cannot be directed into the receiving area 112 through an open non-loading end 120 of the bearing support 100 (the loading end 110 and the non-loading end 120 being directly opposite of one another). In this regard, the bearing support 100 includes a protrusion or ledge 122 that is inwardly extending and that precludes the bearing 90 from being installed through the non-loading end 120.

The loading end 110 of the bearing support 100 includes a pair of chamfered surfaces or ramps 118 (e.g., spherically-shaped). Generally, the ramps 118 are oriented to facilitate directing the bearing 90 into the receiving area 112 in alignment with a slot 114 that receives a lower portion of the bearing 90. These ramps 118 are subject to a number of characterizations. The ramps 118 may be described as at least generally converging toward each other progressing in the direction of the bearing slot 114, the receiving area 112, and/or the non-loading end 120. The ramps 118 may be described as being sloped in the direction of the bearing slot 114.

An end surface of each projection 104 may include a ramp 118 as described. These ramps 118 may be characterized as collectively defining an aperture. Based upon the configuration/orientation of the ramps 118, the effective diameter of this aperture is progressively reduced proceeding in the direction of the receiving area 112, the bearing slot 114, and/or the non-loading end 120. The ramp 118 on one projection 104 may be characterized as sloping in the direction of the opposite projection 104 proceeding in the direction of the bearing slot 114, the receiving area 112, and/or the non-loading end 120. A reference axis 124 may extend through a center of the loading end 110 and the non-loading end 120, and may be disposed parallel to the projections 104. Each ramp 118 may be characterized as converging toward this reference axis 124 proceeding in the direction of the receiving area 112, the bearing slot 114, and/or the non-loading end 120.

A magnet aperture 116 (and thereby the magnet 40) is disposed below a portion of the bearing slot 114 (e.g., a central portion of the bearing slot 114). As such, the magnet aperture 116 may be characterized as intersecting the bearing slot 114. The magnet 40 is positioned within this magnet aperture 116 and should generate a sufficient attractive force to pull the bearing 90 into the bearing slot 114 if the bearing 90 is not properly seated within the bearing slot 114 (e.g., when the bearing 90 is at least partially aligned with the bearing slot 114, but not properly seated within the bearing slot 114). A boundary for the receiving area 112 may be defined by interior surfaces of the two projections 104 and the surface that extends between the two projections 104 (collectively a "perimeter surface"). The bearing slot 114 and the magnet aperture 116 each may be characterized as intersecting this perimeter surface. Moreover, each of the bearing slot 114 and the magnet aperture 116 may be characterized as projecting toward the receiving area 112.

When the bearing 90 is disposed within the bearing slot 114, only a lower portion of the bearing 90 is actually disposed within the bearing slot 114—an upper portion of the bearing 90 is disposed outside of the bearing slot 114 (e.g., the upper portion of the bearing 90 is not restrained within a slot). However, the portion of the bearing 90 that extends above the bearing slot 114 may be disposed against the ledge 122.

The bearing support 100 of FIGS. 8A-8F may be installed on a rotating frame of a centrifuge system as will be discussed in more detail below. In the event that the bearing 90 is not properly seated within the bearing slot 114 when centrifuging is initiated, the resulting centrifugal forces experienced by the bearing support 100 and the ramps 118 may cooperate to direct the bearing 90 to the bearing slot 114. The magnet 40 should then exert a pulling force on the bearing 90 so as to become properly seated within the bearing slot 114.

Figure 9:
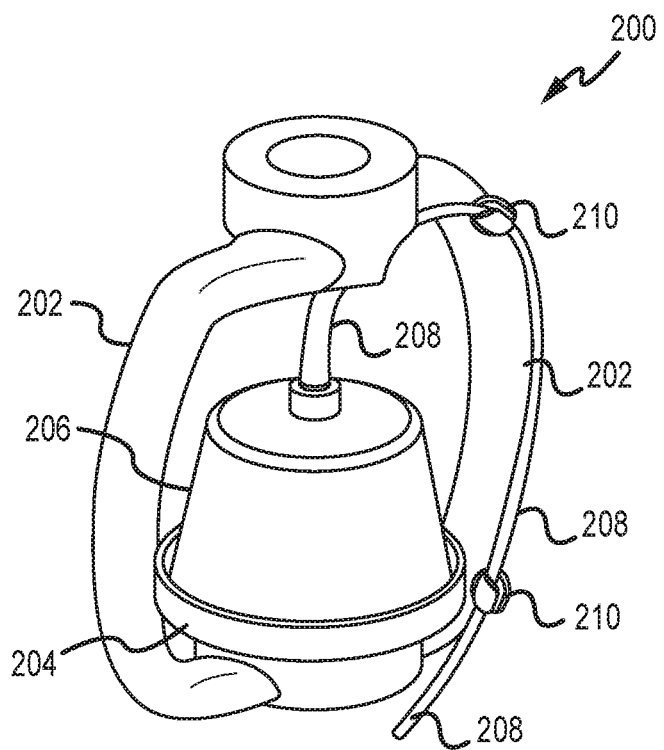
FIG. 9 is an isometric view of a centrifuge system according to some embodiments.

FIG. 9 illustrates use of a bearing support/clamp according to some embodiments. FIG. 9 may be characterized as being illustrative of a centrifuge system 200 that includes a frame 202 (e.g., a pair of drive tube arms), a bowl holder or bowl holding plate 204, and a centrifuge bowl 210 that is secured relative to the bowl holder 204 and that is rotated by a collective rotation of the frame 202 and bowl holder 204. A drive tube 208 extends from the top portion of the centrifuge bowl 206 and extends along a portion of the frame 202 (e.g., one of its drive tube arms). As shown, one or more supports/clamps 210 (e.g., in accordance with any of the foregoing bearing support embodiments) are positioned on the frame 202 (e.g., one of its drive-tube arms). A pair of bearings are mounted on the drive tube 208, and each of these bearings is received by the receiving area of the corresponding bearing support 210. The outer part of the bearing is held in place, while the inner part of the bearing may rotate with the drive tube 208 as the centrifuge bowl 206 spins or rotates.

Figure 9A:
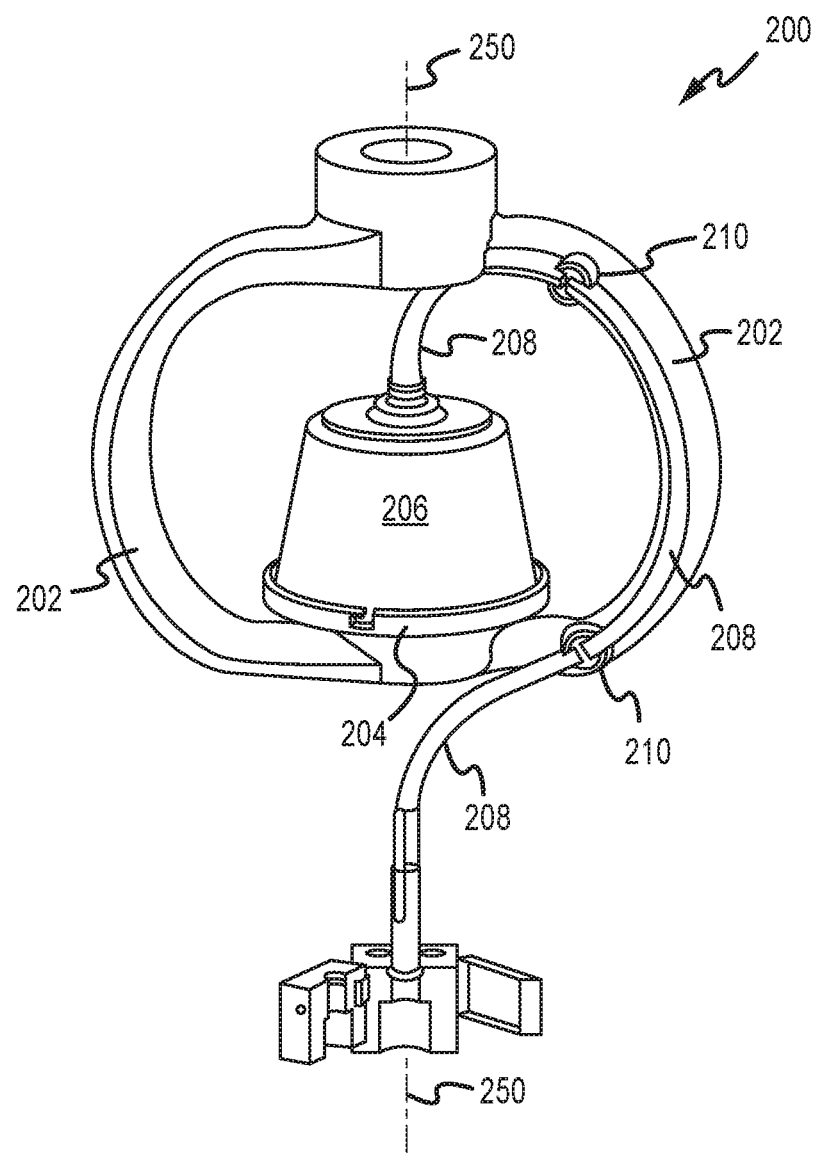
FIG. 9A is another perspective view of a centrifuge system in accordance with FIG. 9.
Figure 9B:
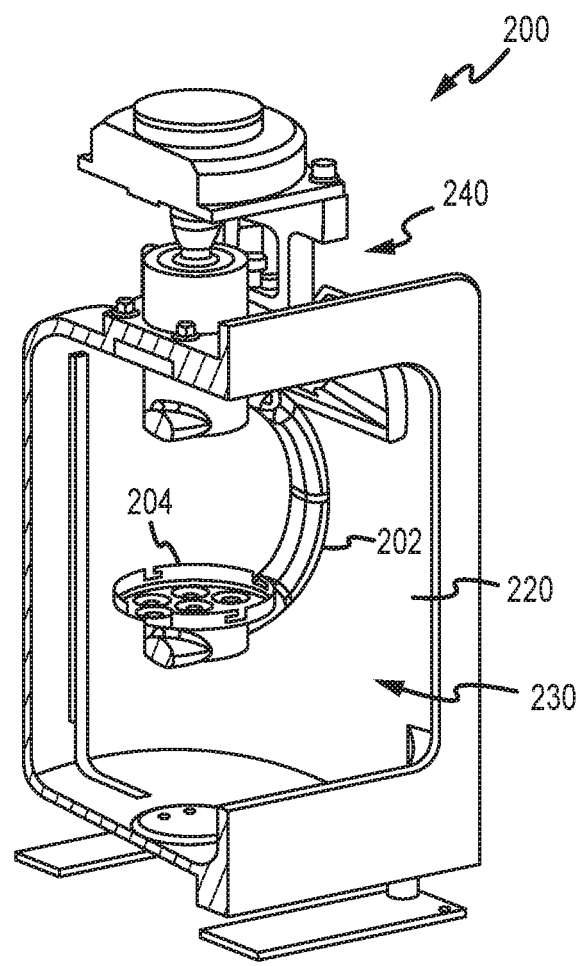
FIG. 9B is a cutaway view of additional components of a centrifuge system in accordance with FIG. 9.

FIGS. 9A and 9B present additional views relating to the centrifuge bowl system from FIG. 9. The centrifuge system 200 may include a centrifuge chamber 230 that is located within a casting or outer housing 220 of the centrifuge system 200. A rotational drive 240 is used to rotate the centrifuge bowl 206 about an axis 250 and when appropriately positioned in the centrifuge chamber 230. The rotational drive 240 may be of any appropriate type/configuration, for instance one capable of utilizing 1-omega 2-omega spin technology.

The above-noted bracket or frame 202 and bowl holding plate 204 are both disposed within the centrifuge chamber 230 and are rotated by the rotational drive 240. The lower portion of the centrifuge bowl 206 is disposed within and is detachably secured to the bowl holding plate 204. The noted conduit or drive tube 208 extends out of the upper portion of the centrifuge bowl 206, is secured to and rotates with the frame 202, and extends through the lower portion of the housing 220 and then out of the centrifuge chamber 230. Certain lines or tubes of a disposable photopheresis kit may be disposed within this drive tube 208 (e.g., a tube for directing whole blood into the centrifuge bowl 206; a tube for directing a lower density blood component, such as plasma and buffy coat, out of the centrifuge bowl 206; a tube for directing a higher density blood component, such as red blood cells, out of the centrifuge bowl 206). The rotational drive 240 rotates the frame 202 and the bowl holding plate 204, which in turn rotates the centrifuge bowl 206 relative to the housing 220 for the centrifuge chamber 230. Rotation of the centrifuge bowl 206 separates whole blood (within the centrifuge bowl 206) into a plurality of blood components within the centrifuge bowl 206, for instance plasma, buffy coat, and red blood cells.

Any and all references to publications or other documents, including but not limited to, patents, patent applications, articles, webpages, books, etc., presented anywhere in the present application, are herein incorporated by reference in their entirety.

Example embodiments of the devices, systems and methods have been described herein. As may be noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements/features from any other disclosed methods, systems, and devices, including any and all features corresponding to bearing support. In other words, features from one and/or another disclosed embodiment may be interchangeable with features from other disclosed embodiments, which, in turn, correspond to yet other embodiments. Furthermore, one or more features/elements of disclosed embodiments may be removed and still result in patentable subject matter (and thus, resulting in yet more embodiments of the subject disclosure). Also within the scope of some of the embodiments of the present disclosure is the specific lack of one or more features that may be present in the prior art. In such embodiments, patentable claims may include one or more negative limitations to indicate such lack of one or more featured taught in the prior art in, for example, any one or more of certain disclosed apparatuses, systems, and methods.

What is claimed is:

1. A bearing support, comprising:
   a base;
   a first open end and an oppositely disposed second open end, wherein a first reference axis extends through said bearing support between said first open end and said second open end;
   a pair of projections that extend upwardly from said base and that are disposed in opposing and spaced relation to one another, wherein each projection of said pair is disposed on an opposite side of said first reference axis, and wherein upper portions of said projections of said pair are separated from one another by an open space;
   a bearing receiving area between said pair of projections that is configured to receive a bearing;
   a magnet aperture that projects toward said bearing receiving area;
   a magnet disposed in said magnet aperture; and
   a bearing slot, wherein said magnet aperture is aligned with and intersects said bearing slot, and wherein said magnet is positioned below said bearing slot.

2. The bearing support of claim 1, wherein said magnet is located between said pair of projections.

3. The bearing support of claim 1, further comprising:
   a perimeter surface that defines a boundary of said bearing receiving area, wherein said perimeter surface comprises an interior surface of each said projection of said pair of projections, and wherein said magnet aperture is located on a portion of said perimeter surface that extends between said pair of projections.

4. The bearing support of claim 1, wherein said open space is smaller than an outer diameter of a bearing for which said bearing support is configured and said bearing support is configured to only allow the bearing to be directed into said receiving area through said first open end.

5. The bearing support of claim 1, wherein end surfaces of said pair of projections collectively define an aperture that extends toward said bearing receiving area, wherein an effective diameter of said aperture is progressively reduced in proceeding in a direction of said bearing receiving area.

6. The bearing support of claim 5, wherein said end surface of each said projection of said pair of projections is spherically-shaped.

7. The bearing support of claim 1, wherein said bearing receiving area is further located between said first open end and said second open end, wherein said first reference axis extends through a center of said first open end and a center of said second open end, wherein said first reference axis is parallel to said pair of projections, and wherein said bearing support comprises a first surface that slopes toward said first reference axis in proceeding from said first open end toward said second open end.

8. The bearing support of claim 7, wherein said first surface is oriented to direct a bearing toward said bearing receiving area.

9. The bearing support of claim 1, wherein said first open end is spaced from said bearing receiving area and comprises a first surface that is sloped.

10. The bearing support of claim 9, wherein a slope of said first surface is oriented to direct a bearing toward said bearing receiving area.

11. The bearing support of claim 9, wherein said first surface is inwardly sloped in progressing toward said bearing receiving area from said first open end.

12. The bearing support of claim 1, wherein said bearing slot is located between said pair of projections.

13. The bearing support of claim 1, wherein said bearing support further comprises a perimeter surface that defines a boundary of said bearing receiving area, wherein said perimeter surface comprises an interior surface of each said projection of said pair of projections, and wherein said bearing slot is located on a portion of said perimeter surface that extends between said pair of projections.

14. A bearing assembly comprising a bearing and the bearing support of claim 1, wherein only a lower portion of said bearing is disposed in said bearing slot such an upper portion of said bearing is disposed outside of said bearing slot.

15. The bearing assembly of claim 14, wherein said bearing support further comprises a ledge, wherein a back side of said upper portion of said bearing is disposed against said ledge, and wherein said ledge precludes said bearing from being directed into said bearing receiving area through said second open end.

16. The bearing assembly of claim 1, wherein said bearing support further comprises a mounting post, wherein said pair of projections extend from one side of said base and said mounting post extends from an opposite side of said base.

17. A centrifuge system, comprising:
a frame;
a centrifuge bowl interconnected and rotatable in conjunction with said frame;
a tube extending from said centrifuge bowl; and
a first bearing, wherein said tube extends through said first bearing, and wherein said first bearing is disposed within said bearing receiving area of the bearing support of claim 1, and wherein the bearing support is mounted to said frame.

18. A bearing support, comprising:
a base;
a first open end and an oppositely disposed second open end, wherein a first reference axis extends through said bearing support between said first open end and said second open end;
a pair of projections that extend upwardly from said base and that are disposed in opposing and spaced relation to one another, wherein each projection of said pair is disposed on an opposite side of said first reference axis, and wherein upper portions of said projections of said pair are separated from one another by an open space;
a bearing receiving area between said pair of projections that is configured to receive a bearing;
a magnet aperture that projects toward said bearing receiving area;
a magnet disposed in said magnet aperture, wherein said bearing receiving area is further located between said first open end and said second open end, wherein said first reference axis extends through a center of said first open end and a center of said second open end, wherein said first reference axis is parallel to said pair of projections, and wherein said bearing support comprises a first surface that slopes toward said first reference axis in proceeding from said first open end toward said second open end.

19. A centrifuge system, comprising:
a frame;
a centrifuge bowl interconnected and rotatable in conjunction with said frame;
a tube extending from said centrifuge bowl;
a bearing support comprising:
a base;
a first open end and an oppositely disposed second open end, wherein a first reference axis extends through said bearing support between said first open end and said second open end;
a pair of projections that extend upwardly from said base and that are disposed in opposing and spaced relation to one another, wherein each projection of said pair is disposed on an opposite side of said first reference axis, and wherein upper portions of said projections of said pair are separated from one another by an open space;
a bearing receiving area between said pair of projections;
a magnet aperture that projects toward said bearing receiving area;
a magnet disposed in said magnet aperture; and
a first bearing, wherein said tube extends through said first bearing, and wherein said first bearing is disposed within said bearing receiving area of said bearing support, and wherein said bearing support is mounted to said frame.

20. The centrifuge system of claim 19, wherein said bearing support further comprises:
a perimeter surface that defines a boundary of said bearing receiving area, wherein said perimeter surface comprises an interior surface of each said projection of said pair of projections, and wherein said magnet aperture is located on a portion of said perimeter surface that extends between said pair of projections.

21. The centrifuge system of claim 19, wherein said open space of said bearing support is smaller than an outer diameter of said first bearing and said bearing support is configured to only allow said first bearing to be directed into said receiving area through said first open end.

22. The centrifuge system of claim 19, wherein end surfaces of said pair of projections of said bearing support collectively define an aperture that extends toward said bearing receiving area, wherein an effective diameter of said aperture is progressively reduced in proceeding in a direction of said bearing receiving area.

23. The centrifuge system of claim 19, wherein said bearing receiving area of said bearing support is further located between said first open end and said second open end, wherein said first reference axis extends through a center of said first open end and a center of said second open end, wherein said first reference axis is parallel to said pair of projections, and wherein said bearing support comprises a first surface that slopes toward said first reference axis in proceeding from said first open end toward said second open end.

24. The centrifuge system of claim 19, wherein said bearing support further comprises a bearing slot, wherein said magnet aperture is aligned with and intersects said bearing slot, and wherein said magnet is positioned below said bearing slot.

25. The centrifuge system of claim 24, wherein said bearing support further comprises a perimeter surface that defines a boundary of said bearing receiving area, wherein said perimeter surface comprises an interior surface of each said projection of said pair of projections, and wherein said bearing slot is located on a portion of said perimeter surface that extends between said pair of projections.

26. The centrifuge system of claim 24, wherein only a lower portion of said first bearing is disposed in said bearing slot of said bearing support such an upper portion of said first bearing is disposed outside of said bearing slot.

27. The centrifuge system of claim 19, wherein said bearing support further comprises a ledge, wherein a back side of said first bearing is disposed against said ledge, and wherein said ledge precludes said first bearing from being directed into said bearing receiving area through said second open end.

28. The centrifuge system of claim 19, wherein said bearing support further comprises a mounting post, wherein said pair of projections extend from one side of said base and said mounting post extends from an opposite side of said base.

* * * * *